(12) United States Patent
Puzicha et al.

(10) Patent No.: US 10,762,142 B2
(45) Date of Patent: Sep. 1, 2020

(54) USER-DEFINED AUTOMATED DOCUMENT FEATURE EXTRACTION AND OPTIMIZATION

(71) Applicant: Open Text Holdings, Inc., Wilmington, DE (US)

(72) Inventors: Jan Puzicha, Bonn (DE); Jan Stadermann, Rheinbach (DE); Chaitanya Muppala, Vijayawada (IN); Sangeetha Yanamandra, Hyderabad (IN); Ketan Deshpande, Hyderabad (IN)

(73) Assignee: Open Text Holdings, Inc., Wilmington, DE (US)

( * ) Notice: Subject to any disclaimer, the term of this patent is extended or adjusted under 35 U.S.C. 154(b) by 0 days.

(21) Appl. No.: 16/398,261

(22) Filed: Apr. 29, 2019

(65) Prior Publication Data

US 2019/0286668 A1    Sep. 19, 2019

Related U.S. Application Data

(63) Continuation of application No. 16/299,128, filed on Mar. 11, 2019.

(60) Provisional application No. 62/643,934, filed on Mar. 16, 2018.

(51) Int. Cl.
*G06F 16/93*     (2019.01)
*G06F 40/166*    (2020.01)

(52) U.S. Cl.
CPC ............ *G06F 16/93* (2019.01); *G06F 40/166* (2020.01)

(58) Field of Classification Search
CPC ......... G06F 40/10; G06F 16/93; G06F 40/166
See application file for complete search history.

(56) References Cited

U.S. PATENT DOCUMENTS

| 5,664,109 A | 9/1997 | Johnson et al. |
|---|---|---|
| 5,826,257 A | 10/1998 | Snelling, Jr. |
| 5,950,196 A | 9/1999 | Pyreddy et al. |
| 6,014,680 A | 1/2000 | Sato et al. |
| 6,222,530 B1 | 4/2001 | Sequeira |

(Continued)

FOREIGN PATENT DOCUMENTS

| EP | 2590117 A1 | 5/2013 |
|---|---|---|
| EP | 2807575 | 12/2014 |

(Continued)

OTHER PUBLICATIONS

International Search Report dated Mar. 11, 2013 in Patent Cooperation Treaty application No. PCT/US2012/071876, filed Dec. 27, 2012, 8 pages.

(Continued)

*Primary Examiner* — Scott T Baderman
*Assistant Examiner* — Mario M Velez-Lopez
(74) *Attorney, Agent, or Firm* — Carr & Ferrell LLP

(57) ABSTRACT

Provided herein are systems and methods for user-defined automated document feature modeling, extraction and optimization. In the present disclosure, an end user of an automated document review system can customize and create new extractor taggers within data models applicable to a set of focus documents. The user-defined edits to the extractor taggers can be further tested in a staging environment, and tested against a ground truth set of documents, before being widely applied to other relevant documents.

20 Claims, 19 Drawing Sheets

(56) References Cited

U.S. PATENT DOCUMENTS

| | | | |
|---|---|---|---|
| 6,546,385 B1 | 4/2003 | Mao et al. | |
| 6,782,144 B2 | 8/2004 | Bellavita et al. | |
| 7,890,533 B2* | 2/2011 | Pollara | G06F 40/284 |
| | | | 707/790 |
| 7,904,326 B2 | 3/2011 | Gharavy | |
| 7,930,197 B2 | 4/2011 | Ozzie | |
| 7,949,629 B2* | 5/2011 | Pollara | G06F 16/36 |
| | | | 707/602 |
| 7,958,164 B2 | 6/2011 | Ivanov et al. | |
| 7,996,211 B2 | 8/2011 | Gao et al. | |
| 8,010,341 B2 | 8/2011 | Achan et al. | |
| 8,037,004 B2 | 10/2011 | Rajkumar | |
| 8,140,323 B2 | 3/2012 | Johnson et al. | |
| 8,204,738 B2 | 6/2012 | Skuratovsky | |
| 8,266,148 B2 | 9/2012 | Guha et al. | |
| 8,306,922 B1 | 11/2012 | Kunal et al. | |
| 8,311,950 B1 | 11/2012 | Kunal et al. | |
| 8,433,558 B2 | 4/2013 | Bangalore et al. | |
| 8,443,013 B1 | 5/2013 | Lin et al. | |
| 8,566,897 B2 | 10/2013 | Sequeira | |
| 8,589,394 B2 | 11/2013 | Vignet | |
| 8,856,642 B1 | 10/2014 | Riediger et al. | |
| 8,943,397 B2 | 1/2015 | Palleschi et al. | |
| 9,146,916 B2 | 9/2015 | Moroze | |
| 9,495,347 B2 | 11/2016 | Stadermann et al. | |
| 9,715,625 B2 | 7/2017 | Stadermann et al. | |
| 10,102,193 B2 | 10/2018 | Riediger et al. | |
| 10,191,893 B2 | 1/2019 | Riediger et al. | |
| 10,387,557 B2 | 8/2019 | Riediger et al. | |
| 10,650,091 B2 | 5/2020 | Riediger et al. | |
| 2001/0014852 A1 | 8/2001 | Tsourikov et al. | |
| 2002/0040375 A1 | 4/2002 | Simon et al. | |
| 2002/0103834 A1 | 8/2002 | Thompson et al. | |
| 2002/0194026 A1* | 12/2002 | Klein | G06F 19/321 |
| | | | 705/2 |
| 2003/0018668 A1 | 1/2003 | Britton et al. | |
| 2003/0112270 A1 | 6/2003 | Newell et al. | |
| 2003/0191727 A1 | 10/2003 | Yao et al. | |
| 2003/0212544 A1 | 11/2003 | Acero et al. | |
| 2003/0229854 A1 | 12/2003 | Lemay | |
| 2004/0078190 A1 | 4/2004 | Fass et al. | |
| 2004/0193520 A1 | 9/2004 | LaComb et al. | |
| 2005/0067482 A1 | 3/2005 | Wu et al. | |
| 2006/0010029 A1 | 1/2006 | Gross | |
| 2006/0116866 A1 | 6/2006 | Suzuki et al. | |
| 2006/0155703 A1 | 7/2006 | Dejean et al. | |
| 2006/0245641 A1 | 11/2006 | Viola et al. | |
| 2006/0253274 A1 | 11/2006 | Miller | |
| 2007/0011134 A1 | 1/2007 | Langseth et al. | |
| 2007/0214010 A1 | 9/2007 | Beaver et al. | |
| 2007/0271249 A1 | 11/2007 | Cragun et al. | |
| 2008/0132799 A1 | 6/2008 | Xue | |
| 2008/0162111 A1 | 7/2008 | Bangalore et al. | |
| 2008/0172597 A1 | 7/2008 | DeHaan | |
| 2008/0221874 A1 | 9/2008 | Cao et al. | |
| 2008/0294679 A1 | 11/2008 | Gatterbauer et al. | |
| 2009/0013246 A1 | 1/2009 | Cudich et al. | |
| 2009/0044095 A1 | 2/2009 | Berger et al. | |
| 2009/0067717 A1 | 3/2009 | Iwasaki | |
| 2009/0110279 A1 | 4/2009 | Jain et al. | |
| 2009/0148048 A1 | 6/2009 | Hosomi | |
| 2009/0171931 A1 | 7/2009 | Avitzur | |
| 2009/0175532 A1 | 7/2009 | Zuev | |
| 2009/0300043 A1 | 12/2009 | MacLennan | |
| 2010/0106485 A1 | 4/2010 | Lu et al. | |
| 2010/0138894 A1 | 6/2010 | Kyojima | |
| 2010/0145902 A1 | 6/2010 | Boyan et al. | |
| 2010/0161627 A1 | 6/2010 | Vossen et al. | |
| 2010/0174732 A1 | 7/2010 | Levy et al. | |
| 2010/0257144 A1 | 10/2010 | Lambert et al. | |
| 2010/0293451 A1 | 11/2010 | Carus | |
| 2010/0312725 A1* | 12/2010 | Privault | G06N 5/043 |
| | | | 706/12 |
| 2010/0325690 A1 | 12/2010 | Suzuki et al. | |
| 2011/0029854 A1 | 2/2011 | Nashi et al. | |
| 2011/0047166 A1 | 2/2011 | Stading et al. | |
| 2011/0047171 A1 | 2/2011 | Paparizos et al. | |
| 2011/0055206 A1 | 3/2011 | Martin et al. | |
| 2011/0106892 A1 | 5/2011 | Nelson et al. | |
| 2011/0141521 A1 | 6/2011 | Qiao | |
| 2011/0153647 A1 | 6/2011 | Hoellwarth | |
| 2011/0258170 A1 | 10/2011 | Duggan et al. | |
| 2011/0268351 A1 | 11/2011 | Huo | |
| 2011/0295854 A1* | 12/2011 | Chiticariu | G06F 16/313 |
| | | | 707/737 |
| 2012/0011428 A1 | 1/2012 | Chisholm | |
| 2012/0030157 A1 | 2/2012 | Tsuchida et al. | |
| 2012/0036130 A1* | 2/2012 | Light | G06F 40/295 |
| | | | 707/736 |
| 2012/0099792 A1 | 4/2012 | Chevion et al. | |
| 2012/0191865 A1 | 7/2012 | Duff et al. | |
| 2012/0221583 A1 | 8/2012 | Kulack et al. | |
| 2013/0013999 A1 | 1/2013 | Kerry-Tyerman et al. | |
| 2013/0054419 A1 | 2/2013 | Yusko et al. | |
| 2013/0073571 A1 | 3/2013 | Coulet et al. | |
| 2013/0117012 A1 | 5/2013 | Orlin et al. | |
| 2013/0124960 A1 | 5/2013 | Velingkar et al. | |
| 2013/0198123 A1 | 8/2013 | Stadermann | |
| 2013/0198201 A1* | 8/2013 | Fukuda | G06N 5/025 |
| | | | 707/741 |
| 2013/0238550 A1 | 9/2013 | Mandelstein et al. | |
| 2013/0238596 A1 | 9/2013 | Mandelstein et al. | |
| 2013/0297412 A1 | 11/2013 | Batra et al. | |
| 2013/0311490 A1 | 11/2013 | Mansfield et al. | |
| 2014/0052755 A1 | 2/2014 | Pitman et al. | |
| 2014/0122535 A1 | 5/2014 | Gerard et al. | |
| 2014/0208218 A1 | 7/2014 | Carasso et al. | |
| 2014/0214758 A1 | 7/2014 | Tripathi et al. | |
| 2015/0026556 A1 | 1/2015 | Stadermann et al. | |
| 2015/0026559 A1 | 1/2015 | Riediger et al. | |
| 2015/0058374 A1 | 2/2015 | Golubev et al. | |
| 2015/0074507 A1 | 3/2015 | Riediger et al. | |
| 2015/0149879 A1* | 5/2015 | Miller | G06F 16/2477 |
| | | | 715/226 |
| 2015/0254791 A1 | 9/2015 | Stockton et al. | |
| 2015/0324338 A1 | 11/2015 | Levy et al. | |
| 2017/0277946 A1 | 9/2017 | Stadermann et al. | |
| 2018/0260370 A1 | 9/2018 | Riediger et al. | |
| 2018/0300300 A1 | 10/2018 | Riediger et al. | |
| 2019/0286667 A1 | 9/2019 | Puzicha et al. | |

FOREIGN PATENT DOCUMENTS

| | | |
|---|---|---|
| EP | 3022659 | 5/2016 |
| EP | 3072063 A1 | 9/2016 |
| WO | WO2002027542 A1 | 4/2002 |
| WO | WO2006002009 | 1/2006 |
| WO | WO2012030954 A1 | 3/2012 |
| WO | WO2013112260 | 8/2013 |
| WO | WO2015009297 | 1/2015 |
| WO | WO2015012812 A1 | 1/2015 |
| WO | WO2015074071 A1 | 5/2015 |
| WO | WO2019178403 A1 | 9/2019 |

OTHER PUBLICATIONS

Chao et al., Layout and Content Extraction for PDF Documents, S. Marinai and A. Dengel (Eds): DAS 2004, LNCS 3163, pp. 213-224, 2004.

Pyreddy, Pallavi, et al., "Tintin: A system for retrieval in text tables", Proceedings of the second ACM international conference on Digital libraries. ACM, 1997, 12 pages.

Pinto, David, et al., "Table extraction using conditional random fields", Proceedings of the 26th annual international ACM SIGIR conference on Research and development in information retrieval. ACM, 2003, 8 pages.

Chen, Hsin-Hsi, et al., "Mining tables from large scale HTML texts", Proceedings of the 18th conference on Computational linguistics—vol. 1, Association for Computational Linguistics, 2000, 7 pages.

(56) References Cited

OTHER PUBLICATIONS

Tengli, Ashwin, et al., "Learning table extraction from examples," Proceedings of the 20th international conference on Computational Linguistics, Association for Computational Linguistics, 2004, 7 pages.

Gatterbauer, Wolfgang, et al., "Table extraction using spatial reasoning on the CSS2 visual box model", Proceedings of the National Conference on Artificial Intelligence. vol. 21. No. 2, Menlo Park, CA; Cambridge, MA; London; AAAI Press; MIT Press; 1999, 2006, 6 pages.

Liu, Ying, et al., "Tableseer: automatic table metadata extraction and searching in digital libraries", Proceedings of the 7th ACM/IEEE-CS joint conference on Digital libraries, ACM, 2007, 10 pages.

Liu, Ying, et al., "Improving the table boundary detection in pdfs by fixing the sequence error of the sparse lines", Document Analysis and Recognition, 2009, ICDAR'09, 10th International Conference on IEEE, 2009, 5 pages.

Yildiz, Burcu, et al., "pdf2table: A method to extract table information from pdf files." 2nd Indian Int. Conf. on AI, Pune. 2005, 13 pages.

RecoStar OCR Solution OpenText Corp., Waterloo, ON, Canada; http://www.opentext.com, accessed Oct. 29, 2013, 4 pages.

OmniPage, Nuance Communications, Inc., Burlington, Mass., USA; <http://www.nuance.com/for-business/by-product/omnipage/index.htm> accessed Oct. 29, 2013, 3 pages.

Lerman et al., Using the Structure of Web Sites for Automatic Segmentation of Tables, ACM 2004, pp. 119-130, 12 pages.

Silva et al., Design of an End-to-end Method to Extract Information from Tables, Google 2006, pp. 144-171.

International Search Report and Written Opinion dated Dec. 23, 2013 in Patent Cooperation Treaty application No. PCT/US2013/050954, 10 pages.

"International Search Report and Written Opinion" Patent Cooperation Treaty application No. PCT/US2013/051698, dated Feb. 10, 2014, 11 pages.

Begum et al. A Greedy approach for computing longest common subsequences. 2008. [retrieved on Jan. 22, 2014] Retrieved from the Internet: <http://www.sms.edu.pk/journals/jprm/jprmvol4/jprm9_4.pdfl>, 6 pages.

Kondrak et al. N-gram similarity and distance. 2005. [retrieved on Jan. 22, 2014] Retrieved from the Internet: <http://citeseerx.ist.psu.edu/viewdoc/download?doi=10.1.1.67.9369&rep=rep1&type=pdf>, 13 pages.

Wang et al., Data Extraction and Label Assignment for Web Database, ACM 2003, pp. 187-196.

"International Search Report and Written Opinion" Patent Cooperation Treaty application No. PCT/US2014/066214, dated Apr. 3, 2015, 12 pages.

Krallinger, Martin et al., Text-mining and information-retrieval services for molecular biology, Genome Biology 2005, 6:224, 8 pages.

Extended European Search Report dated Dec. 3, 2015 in European Application No. 12866444.8 filed Dec. 3, 2014, 9 pages.

Agazzi, Oscar et al., "Hidden Markov Model Based Optical Character Recognition in the Presence of Deterministic Transformations," Signal Processing Research Department, AT&T Bell Laboratories, Jul. 12, 1993, 14 pages.

Ishitani, "Document Transformation System from Papers to XML Data Based on Pivot XML Document Method," Proceedings of the Seventh International Conference on Document Analysis and Recognition (ICDAR'03) 2003, 6 pages.

Shafait et al., Table Detection in Heterogeneous Documents, ACM 2010, pp. 65-72.

Eberius et al., Building the Dresden Web Table Corpus: A Classification Approach, IEEE 2015, pp. 41-50.

Wenzel et al., An Approach to Context0driven Document Analysis and Understanding, Google 2003, pp. 1-12.

Graham, Ian, "Service Oriented Business Rules Management Systems," Jun. 6, 2005, Retrieved from the Internet: <URL:https://trireme.com/Service_Oriented_Business_Rules_Management_Systems.htm>, 75 pages.

Extended European Search Report and Written Opinion, European Patent Application No. 13889423.3, dated Feb. 20, 2017, 7 pages.

"Partial Supplementary European Search Report," European Patent Application No. 14861758.2, dated Jun. 23, 2017, 13 pages.

"Extended European Search Report and Written Opinion," European Patent Application No. 14861758.2, dated Sep. 29, 2017, 12 pages.

"International Search Report" and "Written Opinion of the International Searching Authority," Patent Cooperation Treaty Application No. PCT/US2019/22339, dated May 29, 2019, 10 pages.

"Office Action," European Patent Application No. 13889423.3, dated Sep. 6, 2019, 6 pages.

* cited by examiner

Project Dock

902 

175 Fields   120 Documents

Updates

| | |
|---|---|
| 3 Fields' configuration updated, 2 fields added, 1 field removed | 9/4/2015 |
| 23 Ground truth documents added, 2 removed | 8/3/2015 |
| Configuration published to live system | 7/2/2015 |
| 1 Field's configuration updated, 6 fields removed | 6/1/2015 |

Display

162 Fields in 20 Groups across 3 Tabs in the Tagging Panel
149 Fields in 20 Smart Filter Groups
23 Fields displayed as Results Grid columns

Fields

149 Active fields
    20 System fields
    129 Custom fields
    130 Fields with taggers
149 Inactive fields
    20 System fields
    110 Custom fields

FIG. 10

Tagging Panel

1100

| Reorder | Name | Type | Mandatory | Displayed | Actions |
|---|---|---|---|---|---|
| ^v | Field Q | Custom Field | ● | ● | (edit) (remove) |
| ^v | Tab One | Tab | ▭ | ● | (edit) (add...) (remove) |
| ^v | Group One | Group | ▭ | ● | (edit) (add...) (remove) |
| ^v | Field A | Custom Field | ● | ● | (edit) (remove) |
| ^v | Line Alpha | Line | ▭ | ● | (edit) (add...) (remove) |
| ^v | Field Y | Custom Field | ○ | ● | (edit) (remove) |
| ^v | Field Z | Custom Field | ● | ● | (edit) (remove) |
| ^v | Field B | Custom Field | ○ | ● | (edit) (remove) |
| ^v | Group Two | Group | ▭ | ○ | (edit) (add...) (remove) |
| ^v | Field TableA | Table Field | ● | ● | (edit) (remove) |
| ^v | Group Three | Group | ● | ● | (edit) (add...) (remove) |
| ^v | Field C | Custom Field | ○ | ● | (edit) (remove) |
| ^v | Field D | Custom Field | ▭ | ○ | (edit) (remove) |
| ^v | Group Four | Group | ○ | ● | (edit) (add...) (remove) |
| ^v | System A | System Field | ▭ | ● | (edit) (remove) |
| ^v | Tab Two | Tab | ▭ | ● | (edit) (add...) (remove) |
| ^v | Group Five | Group | ● | ● | (edit) (add...) (remove) |
| ^v | Field E | Custom Field | ● | ● | (edit) (remove) |
| ^v | Field F | Custom Field | ▭ | ○ | (edit) (remove) |
| ^v | Group Six | Group | ▭ | ● | (edit) (remove) |

FIG. 11

Field A  From _Tab One_ , _Group One_ , _Line Alpha_

General

| | |
|---|---|
| Name | Field A |
| Type | Multivalue |
| Active | ☑ |
| Display in | ☑ Result Grid |
| | ☑ Smart Filters |
| | ☑ Tagging Panel |
| Export | ☑ |

Smart Filters

| | |
|---|---|
| Group | First Group Selected by Default |
| Location | at end |

Result Grid

| | |
|---|---|
| Location | at end |

Tagging Panel

| | |
|---|---|
| Mandatory | ☐ *If enabled, field must have a value for tagging to be saved.* |
| Display As | Options depending on data type |

Display In

| | |
|---|---|
| Tab | First Tab selected by default |
| Group | No Group selected by default |
| Line | No Line selected by default |
| | Width  auto |

| Name ⇕ | Type ⇕ | Is Custom ⇕ | In SF ⇕ | In Grid ⇕ | In Panel ⇕ | Is Active ⇕ | Actions |
|---|---|---|---|---|---|---|---|
| Field A | Text | ● | ● | ● | ● | ● | (deactivate)(configure) |
| Field B | Text | ● | ☐ | ☐ | ☐ | ○ | (activate)(configure) |
| Field C | Text | ● | ● | ● | ● | ● | (deactivate)(configure) |
| Field D | Text | ● | ● | ● | ○ | ● | (deactivate)(configure) |
| Field E | Text | ● | ● | ● | ● | ● | (deactivate)(configure) |
| System A | Country | ● | ● | ● | ● | ● | (deactivate)(configure) |
| System B | Currency | ● | ● | ● | ● | ● | (deactivate)(configure) |
| System C | Text | ○ | ☐ | ☐ | ☐ | ○ | (activate)(configure) |

1402

Add New Field find field

1404

Field A

Published Extraction Rules
 Precision: 90%
 Recall: 89%
 Last Published: 12/01/15

Unpublished Extraction Rules
 Has Unpublished Changes: Yes
 Precision: 92%
 Recall: 90%
 Ground Truth Calculations
  Substitutions: 2%
  Deletions: 4%
  Insertions: 1%

FIG. 14

Explore  Field C

1502

Add Tagger

| Scope | Substitutions | Deletions | Insertions |
|---|---|---|---|
| All Documents | | | |
| ### Focus Documents | 10% was 1% | 1% was 40% | 20% was 24% |

Recalculate based on changes    Discard  Save

| Reorder | Name | Type | Has Match | Active | Actions |
|---|---|---|---|---|---|
| ^v | Tagger Y | System | ● | ● | (edit) |
| ^v | Tagger A | Custom | ○ | ● | (edit) |
| ^v | Tagger Z | System | ● | ● | (edit) |
| ^v | Tagger B | Custom | ○ | ○ | (edit) |

Explore | Field C ▼

Add Tagger

| Scope | Substitutions | Deletions | Insertions |
|---|---|---|---|
| All Documents | 12% was 10% | 1% was 4% | 13% was 20% |
| ### Focus Documents | 10% was 1% | 1% was 40% | 20% was 24% |

Recalculate based on changes | Discard | Save

| Reorder | Name | Type | Has Match | Active | Actions |
|---|---|---|---|---|---|
| ^v | Tagger A | Custom | ● | ● | (edit) |

Name [Tagger A]

Active ☑

Slots

1 [ ] w/in [ ] char of

2 [ ] w/in [ ] char of

3 [ ] w/in [ ] char of

4 [ ] ⊞ add slot

Highlight Range

[Slot 2 ▼] through [Slot 4 ▼]

Value Selection

Source [Slots ▼]

Value [Slot 3 ▼]

Test in current document | Cancel | Apply

| ^v | Tagger Z | System | ● | ● | (edit) |

FIG. 16A

1702 — Field: Team name

1704 — Anne Smith is back with the Alpha Beta team as a test driver this year. She made her debut Formula 1 drive last year in Austin, and will be continuing with them for 2019. She says: "I'm extremely happy to continue as Test Driver for Alpha Beta Racing this year, they've done a fantastic job from one year to the other and it's always a privilege to work along side such experienced people. They gave me my first opportunity to drive a Formula 1 car and I love being part of the team.

1706 — 1. From beginning of text to 30 characters, copy next 20 characters.

1708 — pha Beta team as a t

1710 — 1'. From beginning of text to 20 characters, copy next 25 characters.

1712 — ith the Alpha Beta team a

USER-DEFINED AUTOMATED DOCUMENT FEATURE EXTRACTION AND OPTIMIZATION

CROSS-REFERENCE TO RELATED APPLICATION

This application is a continuation of, and claims the priority benefit of, U.S. patent application Ser. No. 16/299,128 filed on Mar. 11, 2019 and titled "User-Defined Automated Document Feature Modeling, Extraction and Optimization". U.S. patent application Ser. No. 16/299,128 in turn claims the priority benefit of U.S. Provisional Patent Application No. 62/643,934 filed on Mar. 16, 2018, and titled "Automated Document Feature Extraction Optimization Systems and Methods". The disclosures of the above-referenced applications are incorporated herein by reference, including all references cited therein.

FIELD

Embodiments of the present disclosure relate to user-customizable automated document feature modeling, extraction, and optimization. In particular, systems and methods that optimize automated feature modeling and extraction of documents using feedback and iterative processes.

SUMMARY

According to various embodiments, the present technology is directed to a computer-implemented method for optimizing automated document feature extraction, the method comprising: providing the user with a graphical user interface to edit at least one field within a set of focus documents and simultaneously view at least one document from the set of focus documents; receiving an edit from the user, via the graphical user interface, to one or more extractor taggers applicable to the at least one field within the set of focus documents; updating a staging environment for the automated document feature extraction system; performing automated document feature extraction in the staging environment on the set of focus documents; verifying that the automated document feature extraction utilizing the edited one or more extractor taggers passes a quality check on the set of focus documents; and updating the automated document feature extraction system with the edited one or more extractor taggers to enhance automated document feature extraction within the focus set of documents and a second set of additional documents.

According to various embodiments, the present technology is directed to a system comprising: a processor; and a memory for storing executable instructions, the processor executing the instructions to: provide the user with a graphical user interface to edit at least one field within a set of focus documents and simultaneously view at least one document from the set of focus documents; receive an edit from the user, via the graphical user interface, to one or more extractor taggers applicable to the at least one field within the set of focus documents; update a staging environment for the automated document feature extraction system; perform automated document feature extraction in the staging environment on the set of focus documents; verify that the automated document feature extraction utilizing the edited one or more extractor taggers passes a quality check on the set of focus documents; and publish the edited one or more extractor taggers in an updated data model within the automated document feature extraction system to enhance automated document feature extraction within the focus set of documents and a second set of additional documents.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 10 illustrates an example landing page presented to a user on a graphical user interface.

FIG. 11 illustrates an example graphical user interface presented to a user of a tagging panel.

FIG. 12 illustrates an example graphical user interface presented to a user of a field editing page from a tagging panel.

FIG. 13 illustrates an example graphical user interface presented to a user of a smart filter.

FIG. 14 illustrates an example graphical user interface presented to a user of a listing of fields present in a project.

FIG. 15 illustrates an example graphical user interface presented to a user of further information regarding changes to a field.

FIG. 16A illustrates an example partial graphical user interface presented to a user for editing a specific tagger.

FIG. 17 illustrates an exemplary use case of an extractor tagger that is modified.

DETAILED DESCRIPTION

Figure 1:
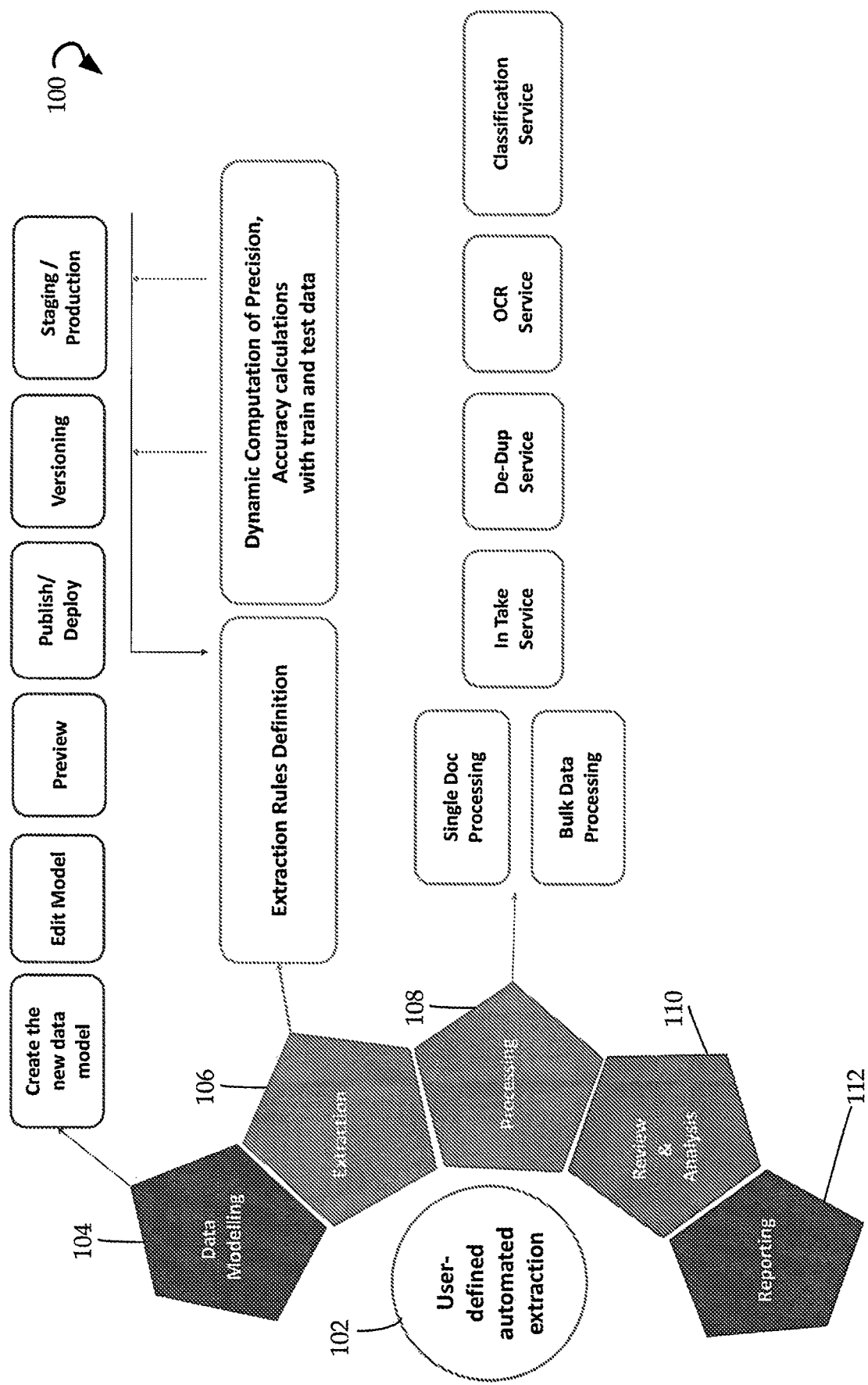
FIG. 1 is an example architecture for a system for user-defined automated document feature modeling, extraction, and optimization, according to various embodiments.

The following detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Current electronic document processing systems typically utilize standard document templates, to assist with information discovery, extraction, and analysis. Additionally, certain documents may exist in hard copy, and then be scanned into a computer. The text of those documents need to be recognized from scanned versions, and analyzed to understand the content contained within. Furthermore, in the case of commercial contracts, an enterprise may need to understand and track the legal responsibilities and requirements for fulfilling the contract. With typical electronic systems, the accuracy of extracted terms from a scanned document such as a contract is around 50%. This can be problematic for an enterprise fulfilling its obligations under the contract, and also for future business planning.

Further, in order for a company to evaluate and analyze multiple documents throughout its enterprise and derive any useful business insights or forecasts from them, an extremely computationally extensive process typically occurs. That is, generating any useful business insight reports based on scanned text, is extremely difficult, if not impossible. The processing of text in scanned documents takes lots of time, including starting with OCR (optical character recognition) to recognize text, then classification and semantic analysis to understand the content of the text, etc.

Currently systems exist where each part of the process from the signing of an individual contract to generation of a business report for an entire enterprise, is conducted in discrete systems by different people. That is, human business analysts manually define a data model for a particular contract template, such as a Master Agreement. As used herein, a data model refers to an abstract representation of a contract. The data model is typically outlined by a business analyst in a spreadsheet format. The spreadsheet contains all of the values that are necessary for fulfilling the contract (for example, deadline, location, etc.).

The business analysts create separate data models for each contract template and baselines. To do this for thousands of contracts applicable across an enterprise is extremely time intensive and cumbersome. From here, business analysts forward this information (typically a spreadsheet), to a computer programmer to create electronic computing data models for a computer to interpret a scanned contract document. Generation of a new data model for a new contract template typically takes 3-6 months.

Further, once the data model is outlined, individual extraction rules for a contract template are typically manually generated by a human. The extraction rules define the fields and text to be extracted from a document. Generation of a complete set of extraction rules can typically take another 3-6 months.

Once the data model for a contract template is created, and the extraction rules created, the document still undergoes further processing before information contained within the document can be understood and used for future business analysis. These plurality of steps are accomplished over months in different and distinct computing systems.

Embodiments of the present disclosure describe a seamless, end-to-end system for a user to create a custom data model and custom extraction rules in one interface, for processing of a corpus of documents. With this system, a user of the computing system can streamline and simplify a multi-step process to seamlessly discover content from a document, and also provide useful and relevant analysis of the content contained therein. A highly manual and time-intensive task can become substantially automated by a user, without the need for computer programming skills.

In the user-defined automated document feature modeling, extraction and optimization system disclosed herein, a user can customize a data model for a particular document template, and also customize extraction rules for automated feature extraction from the document. In this way, no human business analysts are needed to generate large spreadsheets of data and no specialized computer programming skills are required to program a computer to recognize certain fields within a corpus of documents, including scanned documents.

Further, utilizing embodiments of the present disclosure, users can adopt new document templates at a faster pace by creating data models themselves, editing and publishing data/index models. A user defines an abstract structure of data upon which further analysis is performed, in a user-defined data model. This highly abstract structure of data is used in index engines which creates an index while ingesting the data. All of the AI (artificial intelligence), ML (machine learning) and NLP (natural language processing) modeling can be performed on top of this index.

FIG. 1 depicts example architecture 100 for a system for user-defined automated document feature modeling, extraction and optimization 102 (also sometimes referred to herein as simply automated system 102 or system 102). The system 102 incorporates multiple components into one engine that is editable and customizable by an end user. Previously, data modeling 104 for documents was a discrete system handled by a particular team of humans, extraction 106 was a separate system handled by a different team of humans. Similarly, processing 108, review and analysis 110, and reporting 112 were all separate computing engines. With the present disclosure, all of these components are combined into a single system 102.

Data modeling 104 engine enables a user to create a new data model, edit the model, preview what it may look like when applied to a document or corpus of documents, publish/deploy it within the document management system, create multiple versions of it for testing, and apply it to production level software for implementation across the enterprise.

Extraction 106 engine enables a user to define extraction rules for automated document feature extraction, and also optimize those extraction rules by providing a dynamic computing of precision and accuracy calculations with training and test data. In this way, a user can see the effects of a particular extraction rule or set of rules and adjust accordingly until a desired accuracy result is achieved for this particular corpus of documents.

Processing 108 engine provides for the processing of a single document, as well as many documents. It also provides an in-take service for new documents, a de-dup service to recognize and discard duplicate documents, an OCR service for recognizing text from a scanned document, and a classification service to classify documents based on content.

Figure 2:
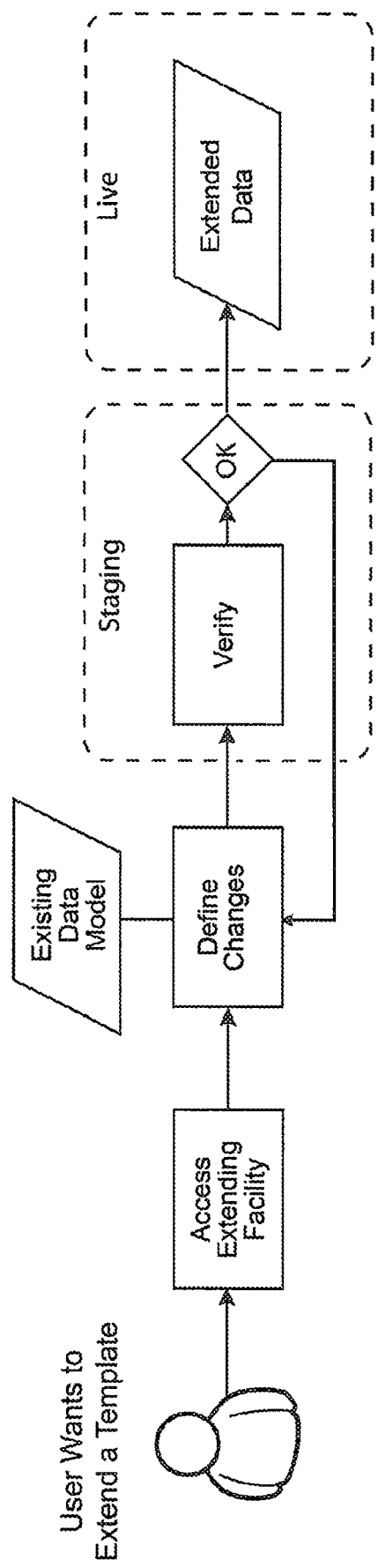
FIG. 2 is an exemplary process flow for embodiments of the presently disclosed system enabling user-defined automated document feature modeling, extraction and optimization.

FIG. 2 depicts a simple flow for embodiments of the presently disclosed system enabling user-defined automated document feature modeling, extraction and optimization. As would be understood by persons of ordinary skill in the art, FIG. 2 is a simplified version for exemplary purposes only. There can be additional steps that are not depicted in the figure.

In FIG. 2, the process begins when a user wants to change or extend the way a document template is processed by the automated electronic system. First the user accesses an extending facility, then defines changes to the existing data model, and finally the extended data model is automatically generated by the computing system. Further, the extended data model can first be published in a staging environment for testing and verification, to ensure that the data model changes input by the user are operating as intended. If not, then an iteration process can allow the user to define further changes to the data model and continue verifying in the staging environment until the automated document feature modeling is operating as desired. Then the extended data model becomes live for all relevant documents of the automated system. With this process, a data model can be generated and edited by an end user herself, in a matter of days, rather than months.

Figure 3:
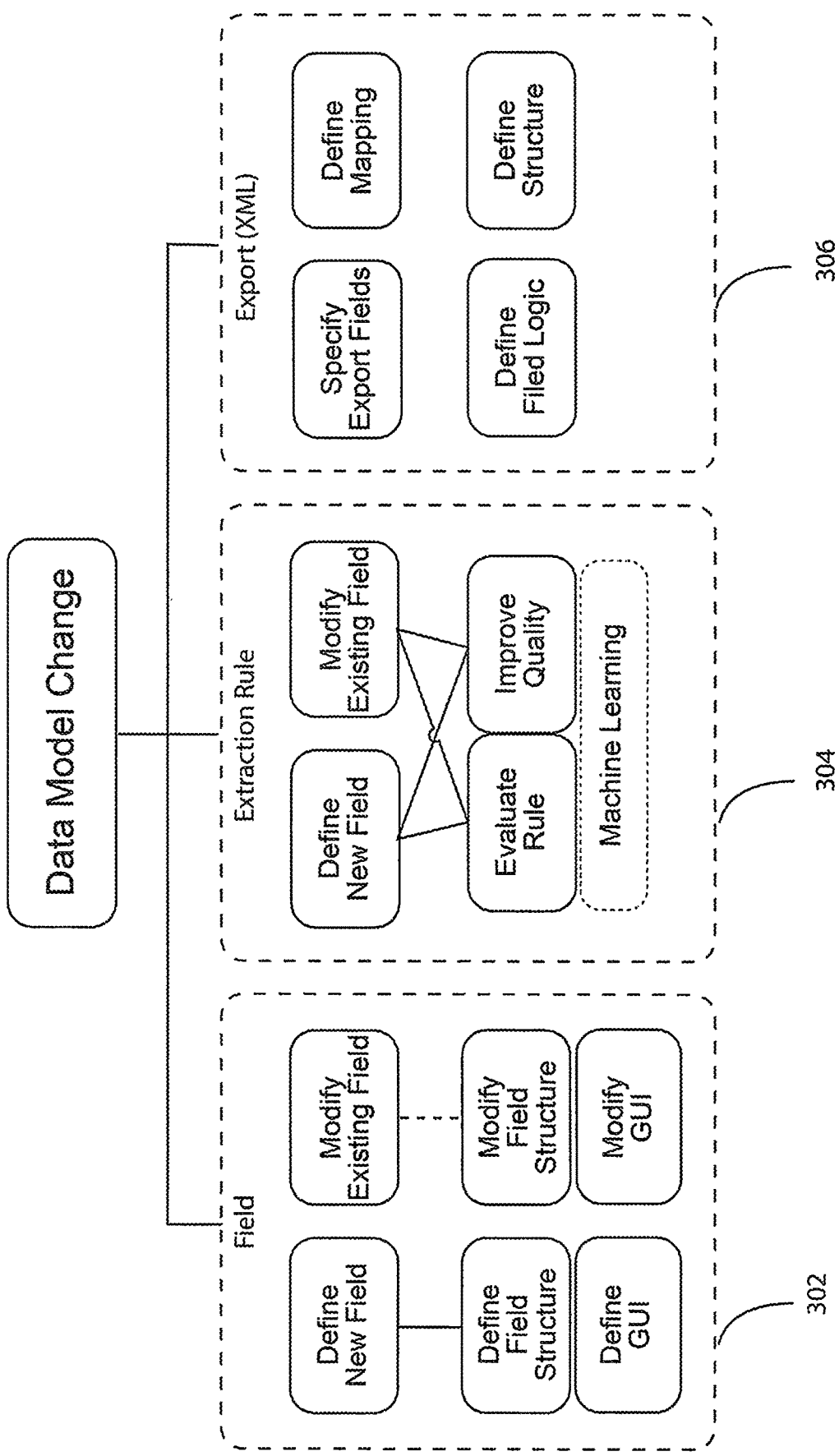
FIG. 3 exemplary categories where users can define changes to an existing data model, according to various embodiments.

FIG. 3 depicts exemplary categories where users can define changes to an existing data model. Box 302 depicts that changes can be made to specific fields within the data model. A user can define new fields to be recognized from documents by the automated system 102, or modify existing fields. Properties such as field structure and GUI (graphical user interface) can be defined and modified for new and existing fields, respectively.

Box 304 depicts that extraction rules can be edited directly by users. New extraction rules can be defined, or existing extraction rules can be modified in an iterative process until a desired level of accuracy of automated document feature recognition and extraction is achieved by the automated system 102. These extraction rules are then used to update the machine learning for future document recognition and extraction by the automated system 102.

Box 306 depicts that a user can change export properties for the data model. A user can specify specific fields for export in any format, such as XML. The user can further define field logic, mapping, and structure of export data.

FIG. 3 depicts data model changes that can be made directly by an end user of the system, without specialized human business analysts or software programmers needed to make changes to the underlying global software system. As would be understood by persons of ordinary skill in the art, fewer or additional categories may actually be present in various embodiments, than those depicted in exemplary FIG. 3.

At a high level, with this capability to implement data model changes by a user directly, the user can browse/ navigate fields by UI grouping, find specific fields by name, enable/disable fields, change the display name of a particular field, create/remove a custom simple field, add/remove a custom field value, change field value display name, and many more things.

Further, the present disclosure allows a user to make versioned document data models. Any data model change creates a new data model version, with versions being assigned to documents at ingestion time. Thus, new fields are not active on previously existing documents. Further, for previous existing documents, fields are not removed, but rather shown as hidden. Thus, inadvertent data model changes are not implemented across the board until it can be verified that the changes do not disrupt previous document field modeling and extraction in an undesirable manner. Further, the data model version to be applied to documents in the corpus of documents can be accomplished using bulk tagging. Thus, the process of applying a new data model to documents can be accomplished in a simplified manner.

In addition, UI groupings of a data model can be edited by a user. In general, fields can be moved to a different UI group, the display name of a UI group can be changed, custom UI groups can be added or removed, UI groups can be hidden or unhidden, and UI groups can be moved to a different parent.

A user can also edit a data model by managing dependencies between fields and groups. For example, a user can select to display a field if a second field has specific value(s), display a field only if a second field does not have a given value, display a field only if a second field has any value, display a field only if a second field has more than one value, etc. Dependencies can be specified on multiple fields in combination as well.

Advanced users can also make more sophisticated edits to a data model, such as logging and auditing of changes made to the data model. In addition, new data models can be created entirely, a smart filter for a field can be enabled or disabled, display properties (such as input width and rendition type) can be changed, a user can specify that a field is used in the main document list grid. The system can further support read-only fields loaded from external source(s), provide management of (shared) data model sections, and disable field values.

As would be understood by persons of ordinary skill in the art, a field type can be any field that a user wishes to recognize and extract from a document. Exemplary field types include: text, single-value field (fixed range of user-defined options), multi-valued field, table(s), boolean, date, time, numeric, amount, percentage, currency, country, city, stock exchange, rating agency, parties, applicable (applicable/not applicable), (not specified/other), and other custom list types shared across data models.

Figure 4:
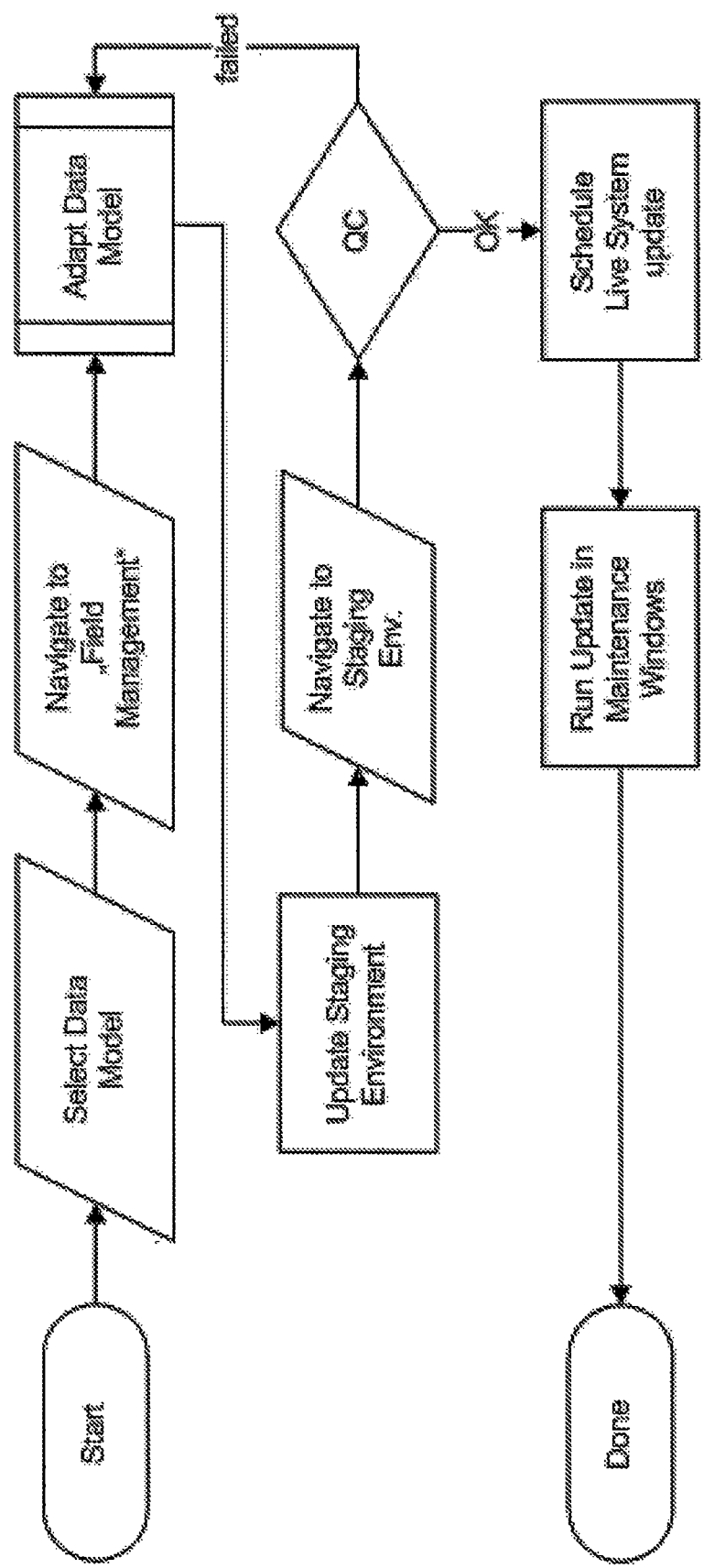
FIG. 4 depicts an exemplary simplified process flow for data model changes in exemplary embodiments.

FIG. 4 depicts an exemplary simplified process flow for data model changes in exemplary embodiments. In FIG. 4, the process starts with a user selecting a particular data model for editing. The user navigates to field management and adapts the data model as desired. The data model in the staging environment is updated. From there, the user can navigate to the staging environment and perform a quality check to ensure that the adapted data model is operating as desired. If so, a live system update is scheduled to broadly apply the edited data model across additional, or all, relevant documents. If the quality check does not pass, then the user can continue to update the data model until it operates as desired in the staging environment.

As discussed herein, one component of data modeling is extraction rules. With embodiments of the present disclosure, a user can also manage rules-based extraction of text from documents. The user can make changes in the data model, such as manage rules (slot taggers and complex rules), define a ground truth, evaluate the rules, and conduct a statistical quality assessment of the overall extraction of text from the documents.

In general, the present disclosure involves systems and methods that extract content from documents using automated extractors. These extraction capabilities are enhanced in these systems using a combination of GUI driven user adjustment to extractor rules that can be tested against a representative set of documents (e.g., focus documents). As the extractor rules are modified by the user, these modified extractor capabilities are executed against the representative set and scored for extraction accuracy. If the extraction accuracy is less than the user desires, the extraction rules can be further modified. Once an acceptable level of extraction accuracy is achieved relative to the focus set, the modified extractor rule sets are then applied to a larger corpus of documents from which the focus documents were originally obtained.

These systems and methods expose extraction capabilities to an end user who may not necessarily be familiar with document extraction. The GUIs provided herein provide a user-friendly interactive interface that allows users to define extraction parameters or tasks. To be sure, an extraction rule or model used herein is provided to automate systems that search and extract fields from documents, and populate a database record with the extracted information. This is used to determine what parts of a document are of interest and are extracted in a machine readable manner. In general, a data model is a set of terms that are desired to be extracted from a corpus documents. Extraction rules allow for automatic extraction of fields from a document, for example, the terms and conditions of a contract, but the same principles can be applied to extract any desired feature from other similar or different document types.

In general, the user can teach a representative extraction system how to improve its auto-extraction process. The present systems perform a training process where an extraction model is at least partially modified by a user and this model is then run against a large set and its extraction accuracy is determined.

The dashboards or GUIs disclosed herein provide a combination of various classes of rules that are easy to use, with automatic testing on corpus preformed thereafter. Thus, the user can utilize the system to view a handful of documents (focus documents) to inspire them about what needs to be improved (by looking at insertions, deletions, etc.), which are indicative of possible ways the user can fine tune extractor rules. To be sure, when an extractor is executed against a set of documents (e.g., corpus), the system will identify documents in the corpus which included terms that were extracted base on the rule set(s) applied. These extractions can involve insertions, deletions, transpositions, or other similar operations. These extractions, in some embodiments, are based on a seed set of hard coded documents (e.g., ground truth documents) that have been verified as having been properly coded by a human reviewer. These extractions are performed using extractor models/rules that were based on these seed documents.

As noted above, the user can optimize rules based on the seed documents. Example optimizations include modifying slot tagger, creating new slot tagger, or reordering slot taggers. In general, a tagger is generally referred to as an extraction rule. A set of extraction rules can be applied to focus documents and ultimately the corpus. These new extractor rules are then run against a focus set and the system determines if an extraction improvement is achieved. The set of extraction rules can be considered an ordered set of operations performed against the corpus and/or the focus document set. Thus, any change in the order of operations (reordering slot taggers) can have a measurable effect on the extraction process.

If an improvement that meets expectations is achieved, the system progresses to applying the modified/optimized rule sets to the corpus. In instances where the extractor rules do not produce desired improvements when run against the focus documents, the user can be prompted to continue iterating until the extractor scores improve. These scores are discussed in greater detail below.

An exemplary extraction model implemented within a data model can include extraction of text from documents by taggers tied to a specific field. There can be system level taggers and also user-defined custom slot taggers. For example, a custom-defined slot tagger may include slot matches for primitives such as currencies, countries, etc. or matching of multiple regular expressions. Further, the order of taggers can be custom defined by a user.

As an example of extraction by taggers tied to a particular field, a specific extraction tagger may desire to extract a currency from a document. An extraction tagger may be defined that states to find "Base currenc*" within 5 characters of the word "Currency" within a document. In this way, if the automated system recognizes the word "Currency" in a document, it will search for the term "Base currenc*" within 5 characters to extract a currency field from a document. A user can specify any such search term. For example, while the term "base currenc*" may be used in one particular set of documents, a different term, such as "home currenc*" may be used in a different set of documents. By enabling a user to create and define customized extraction taggers for each field for a particular data model applied to a set of documents, the overall extraction of relevant text from all documents is improved. Further, by applying these edits at the end-user level, and not at the system level, unnecessary rules that do not apply to a certain set of documents don't have to be processed by the computing system, thus speeding up processing time of document review and processing and utilizing fewer computing resources in the process.

Figure 5:
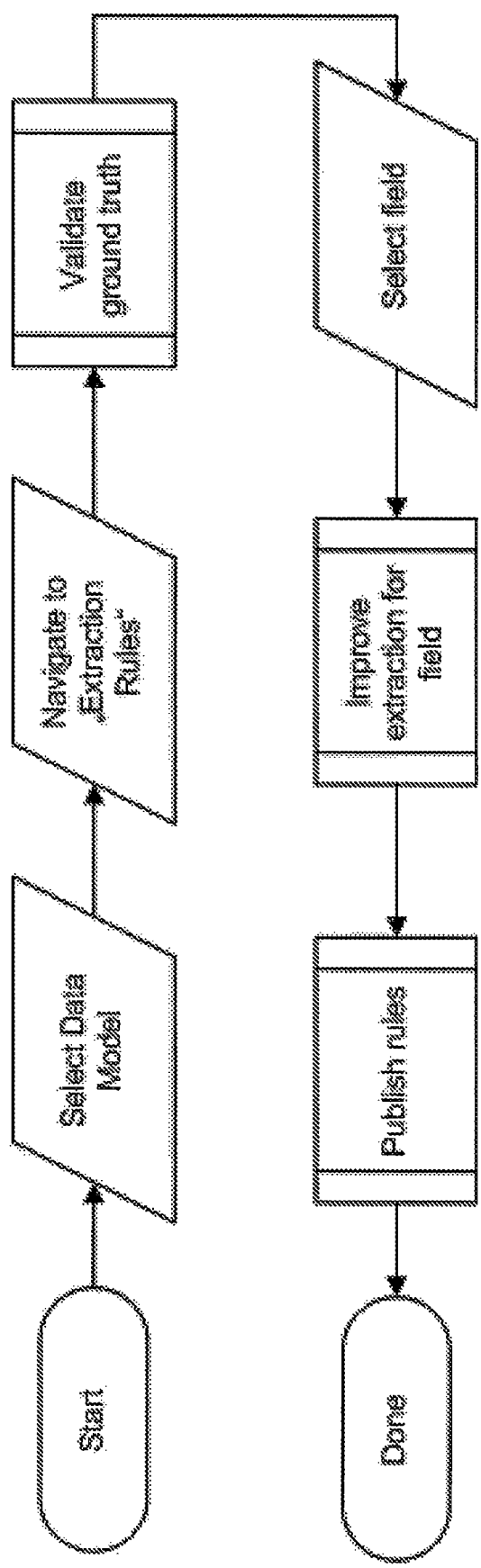
FIG. 5 illustrates a simplified exemplary use case for improving extraction quality for a particular field.

FIG. 5 illustrates a simplified exemplary use case for improving extraction quality for a particular field. The process begins with a user selecting a particular data model to work with. Within the data model, the user navigates to the extraction rules and validates the ground truth with the existing extraction rules. Then a particular field is selected, the user can edit one or more extraction taggers or rules applicable to the selected field to improve the extraction of relevant text for the field from documents. Once improved, the new extraction rules can be published and applied to further documents.

Figure 6:
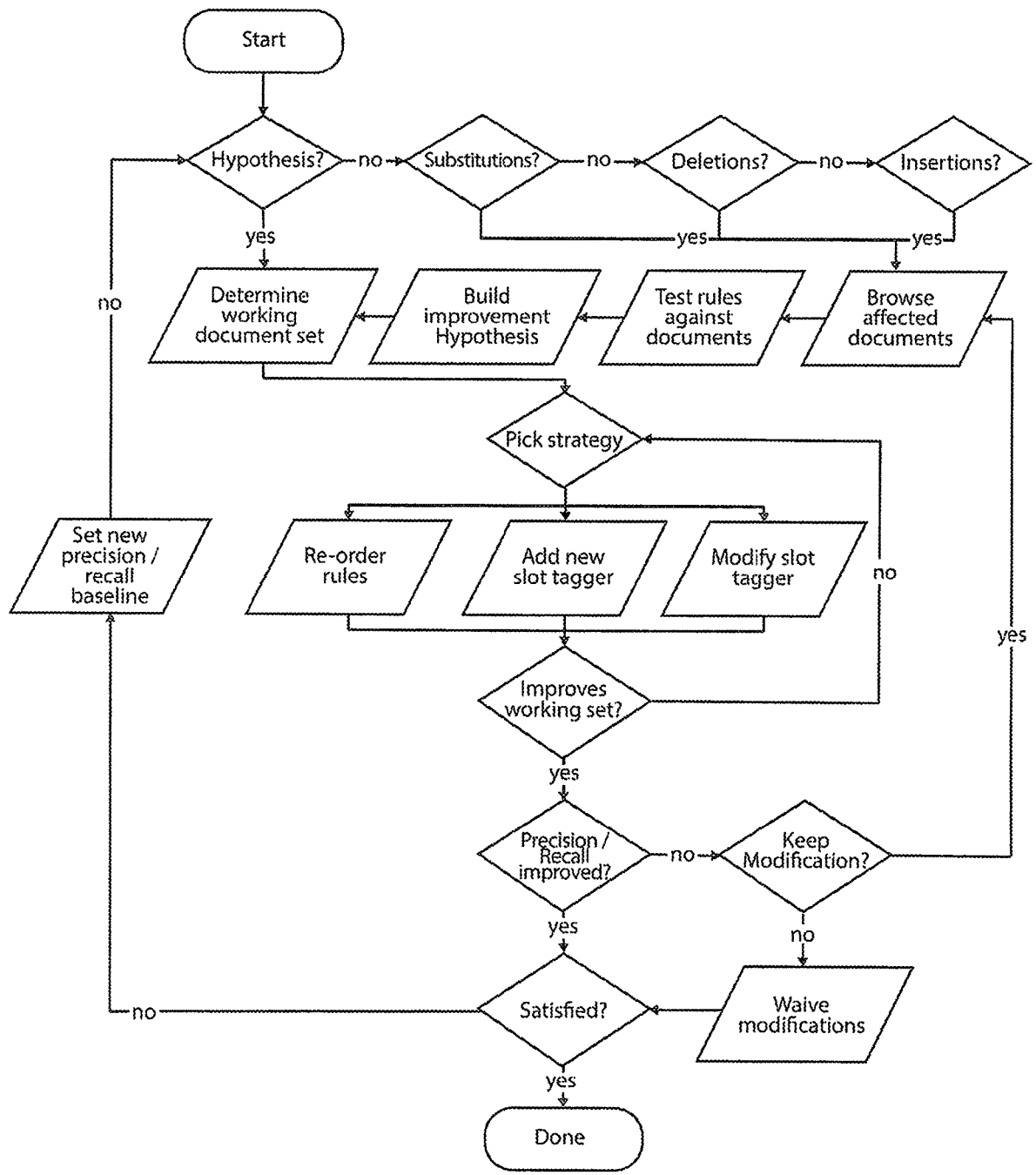
FIG. 6 illustrates another embodiment of a process flow for improving the automated document feature extraction quality for a particular field.

FIG. 6 illustrates another embodiment of a process flow for improving the automated document feature extraction quality for a particular field. In the exemplary embodiment, if a user already has a hypothesis of a particular rule change needed, then the user can determine a working document set to use, and then decide whether to reorder existing extraction rules, add a new slot tagger, or modify an existing slot tagger. If this improves the extraction on the working document set, then the user can continue with the process. If the extraction on the working document set is not improved, then the user can further edit the slot tagger(s).

If the user does not already have a hypothesis of what needs to be edited, then the user can select whether editing needs to be made to substitutions, deletions, or insertions made to the automated document feature extraction. The user can browse the affected documents for substitutions, deletions, and/or insertions and test various rule(s) against those documents. From this testing, the user can generate an improvement hypothesis as to how the substitutions, deletions, and/or insertions can be improved by the automated document feature extraction. Then a working document set can be determined, and the extraction rules edited accordingly. Once the user is satisfied that sufficient improvements have been made, then the process is complete. If the user is not satisfied, then the user can set a new baseline for precision required by the automated document feature extraction and determine a new hypothesis.

By utilizing this process, multiple documents can be reviewed to ensure user edits to extraction rules improve extraction precision across multiple document sets, instead of inadvertently improving precision in one set of documents while degrading precision in another set of documents. Further, the user can test the new rules against the ground truth set of documents before accepting changes to ensure that the overall precision and accuracy of the automated document extraction is indeed improved by the changes.

Figure 7:
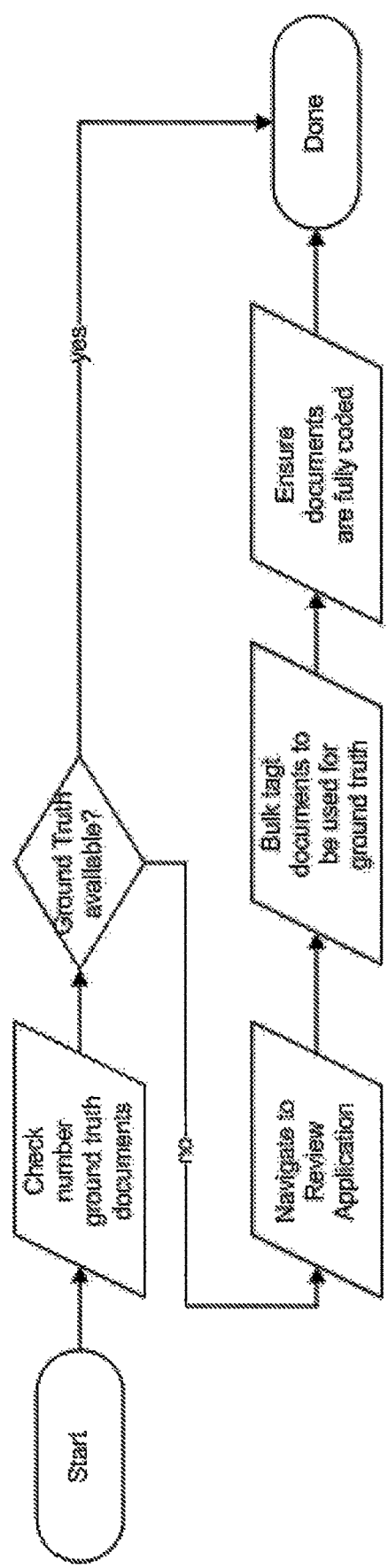
FIG. 7 illustrates an exemplary flow process for validating ground truth documents.

In various embodiments, before extraction rules edits may be published, they may be validated against the ground truth to run a quality report. FIG. 7 illustrates an exemplary flow process for validating ground truth documents. Documents coded as "ground truth" in the live system are flagged. In exemplary embodiments, 200-500 different documents are flagged as being "ground truth" documents.

The process starts with a user checking the number of ground truth documents. If sufficient ground truth documents are available, then the process is complete. If sufficient ground truth documents are not available, then the user can navigate to review the overall application and bulk tag documents within the application to be used for ground truth. The user then ensures the documents are fully coded and then the process is complete.

In this way, a user can browse extraction rules, create/manage slot taggers, change order of taggers, define a ground truth for measuring extraction rules, measure precision/recall for specific fields, measure overall precision/recall, and navigate to select document sets, such as all ground truth documents, false positives, and false negatives.

A third aspect of user-defined editing of data models, is user editing of export parameters from reviewed document set(s). A user can undertake customization actions, such as defining an export ID, enable/disable fields for export, map party A/B fields into party/counter party fields, map field values, map empty value onto new value, manage dependency relationships, export hierarchy/field order definition, and create or edit conditional mappings. As would be understood by persons of ordinary skill in the art, this list is merely exemplary and other parameters of export may also be user-customizable.

Figure 8:
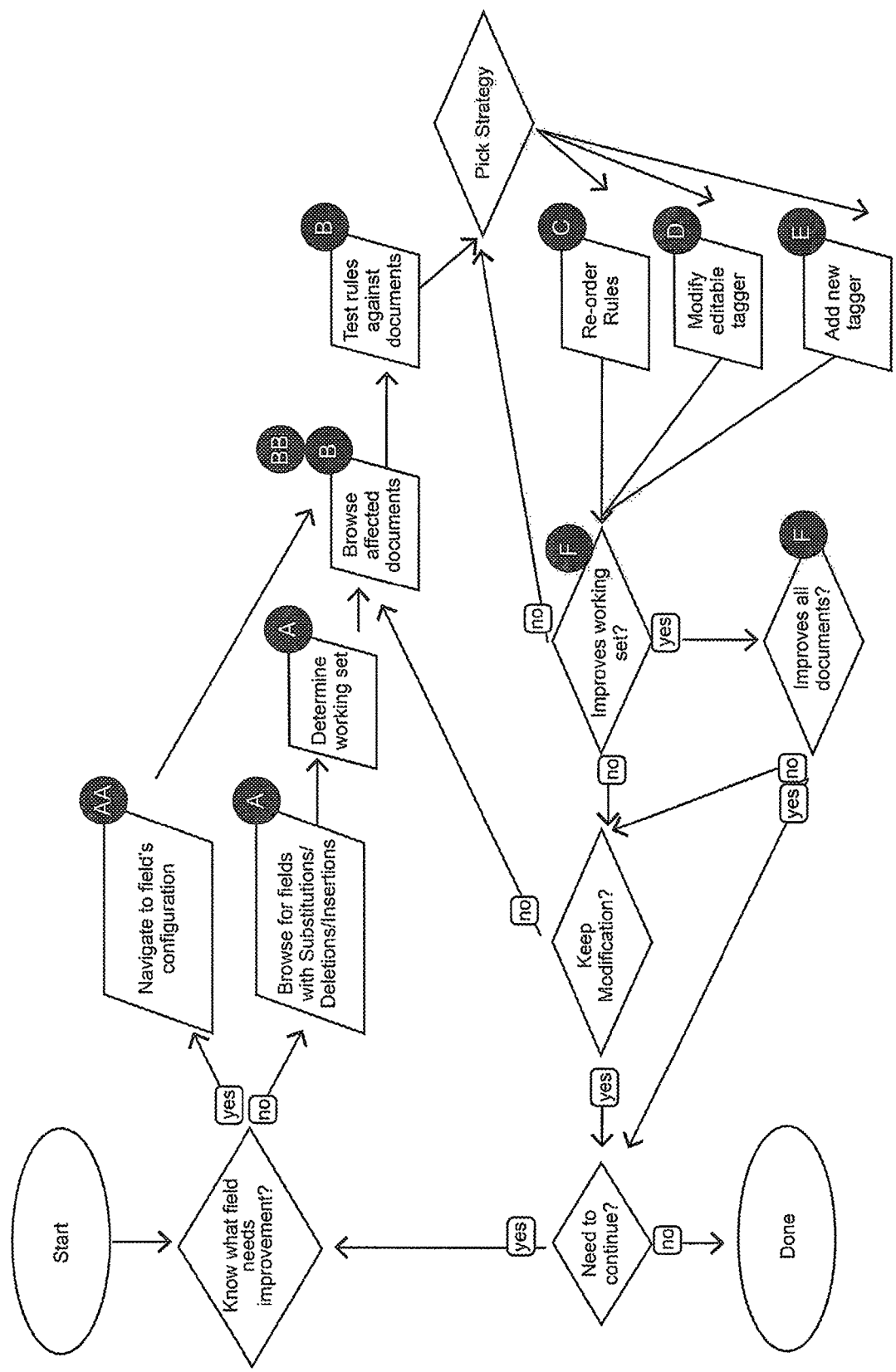
FIG. 8 illustrates another exemplary process flow of the present disclosure, in various embodiments.

Turning now to FIG. 8, an example flow diagram of a process of the present disclosure is illustrated. In step AA, a user can see an entire list of fields in the system, and can filter directly to the field they want to access. The user can further use links and filters on the page to narrow a document result list.

In step A, a user is presented with a field-specific S/D/I set of percentages in a GUI or dashboard. The exemplary GUI described herein provides the user with focus documents (presented on the right pane of the UI) and an extractor slot tagger pane where the user can specify new slot taggers or reorder (or remove) existing taggers.

Turning back to the flow diagram of FIG. 8, the S/D/I set of percentages involves substitutions, deletions, and insertions, which were required in order to perform an initial extraction of features from a set of focus documents. The relative percentages of these aspects are illustrated in the UI in FIG. 16A. Based on reconfiguration/modification of extractor tagger rules, the focus documents can be reassessed and the S/D/I set of percentages are consequently recalculated. In the example in FIG. 16A, the changes indicate that deletions were reduced from 40% to 1% and insertions were reduced from 24% to 20%. Substitutions increased from 1% to 10%. This increase in substitutions might not be acceptable to the user, so further extractor slot tagger changes might be undertaken to attempt to improve the substitution percentage. The S/D/I set of percentages are calculated for both the corpus (all documents) and the focus set.

Turning back to the flow diagram on FIG. 8, the user can use links and/or filters on the UI to narrow a document result list. The user can also see all fields of extracted documents and can filter out documents based on what they desire to review. In step B the user can drill down into a field specific view, which includes specific extractor slot taggers and representative documents. The user can further explore the contents of a specific document in the representative documents and use that document as the basis for modifying the extractor slot taggers associated therewith. In step C the user can enter a field-specific view, listing relevant taggers for that field and showing relevant documents. The user can drill into a specific document set to explore how terms are being extracted, and that document set can be used when moving into edit mode.

In step D, the user can edit specific taggers and review effects of the change, within the field-specific interface. In step E, a user can add new taggers and review effects of the change within the field-specific interface.

The automated system 102 then executes these optimized extractor slot taggers in step F and determines if an improvement to the focus set of documents is present (e.g., change in any S/D/I percentage). In step F, the system can further apply the optimized extractor slot taggers to the field's focus set of document, and also for all documents in the ground truth set. The user modifications of the slot taggers can be retained or disposed of as desired. The user can also iterate on the optimized extractor slot taggers if a desired change in percentage values is not achieved.

In some embodiments, the present disclosure involves a method that includes generating a set of focus documents by applying extractor taggers. To be sure, the extractor taggers are re-created from one or more ground documents. The method can also include generating a GUI that includes an extractor slot tagger interface and the set of focus documents. Again, the extractor slot tagger interface provides a means whereby a user can any of add, modify, and reorder the extractor taggers to create updated extractor taggers. Also, the GUI further includes values for operations performed on the focus documents or a corpus that includes the focus documents when applying the extractor taggers. In some instances, the values are updated upon application of the updated extractor taggers to the focus documents or the corpus. These steps can be performed in combination with any other features or steps disclosed herein.

Figure 9:
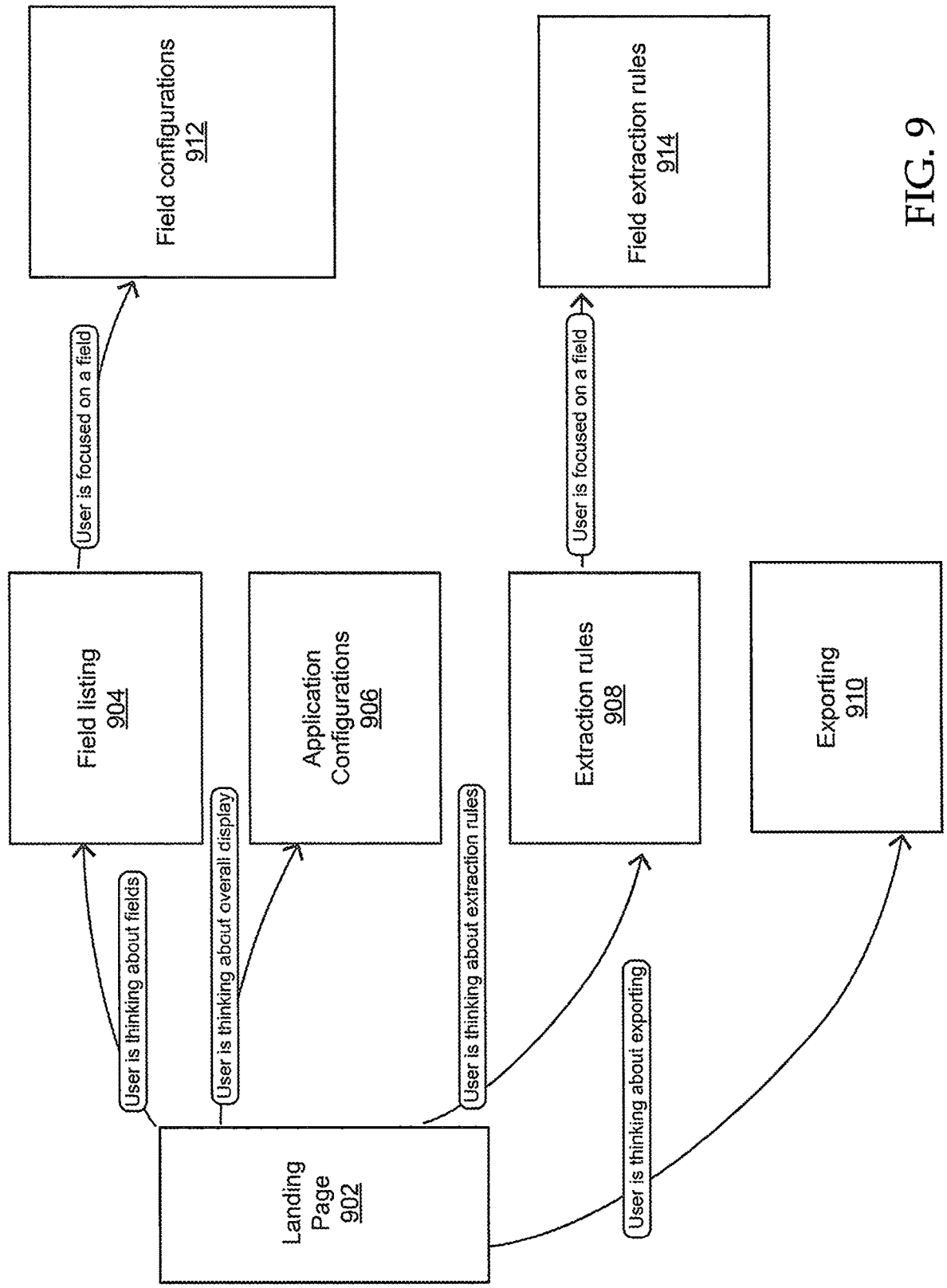
FIG. 9 depicts an overall system architecture for a user to optimize automated document extraction.

FIG. 9 depicts an overall system architecture for a user to optimize automated document extraction. The user first is presented with a landing page 902 on a graphical user interface. From here, the user can view a field listing 904, application configurations 906, extraction rules 908, or exporting information 910.

The field listing 904 page allows for light management of fields, such as activation and deactivation of certain fields. Field configurations 912 provide a display with information such as a grid of field properties, smart filters, tagging panel, values and configurations for each specific field, and extraction rules that are applicable to that field.

Application configurations 906 provide a tagging panel, smart filters, and a results grid. Extraction rules 908 allow for a user to test ground truth overall, and provides an overview of field success and overview of a document list. Field extraction rules 914 allow for a user to test and browse extraction rules for a specific field, including reordering and configuring.

FIG. 10 illustrates an example landing page 902. The landing page 902 shows an overview that there are 175 fields and 120 documents in the project. It also lists updates that have been made, and presents a bit more detailed information about the fields. As would be understood by persons of ordinary skill in the art, the landing page 902 may include fewer or additional components that presented here.

FIG. 11 illustrates an example graphical user interface of a tagging panel 1100. The tagging panel allows a user to view fields, groups, and tabs. The user can also view whether each specific field is a custom field or a system field. In various embodiments, custom fields may be editable by a user whereas system fields are not editable. The field can also be marked as being mandatory, and/or deployed in a set of documents. A user can further take specific actions such as adding, editing, and removing a field from the tagging panel.

In various embodiments, a search box may also be provided on tagging panel 1100 for a user to search for a specific field, line, group, or tab. This way, a user can quickly filter to a particular component. A link to preview changes may also be provided on tagging panel 1100. This provides the user access to a preview of the configuration so they can verify any changes without having to leave the current page. A link to allow a user to add children to a selected component of a row may also be provided. As would be understood by persons of ordinary skill in the art, tagging panel 1100 may include fewer or additional components than those illustrated in exemplary FIG. 11.

FIG. 12 illustrates an example graphical user interface of a field editing page from a tagging panel, such as tagging panel 1100 of FIG. 11. In the exemplary depiction of FIG. 12, a user can view information about a specific field, such as "Field A". The name of the field is provided, along with the type of field. It can be selected as being active or not, and a user can select various places where the field is displayed.

Figure 13:
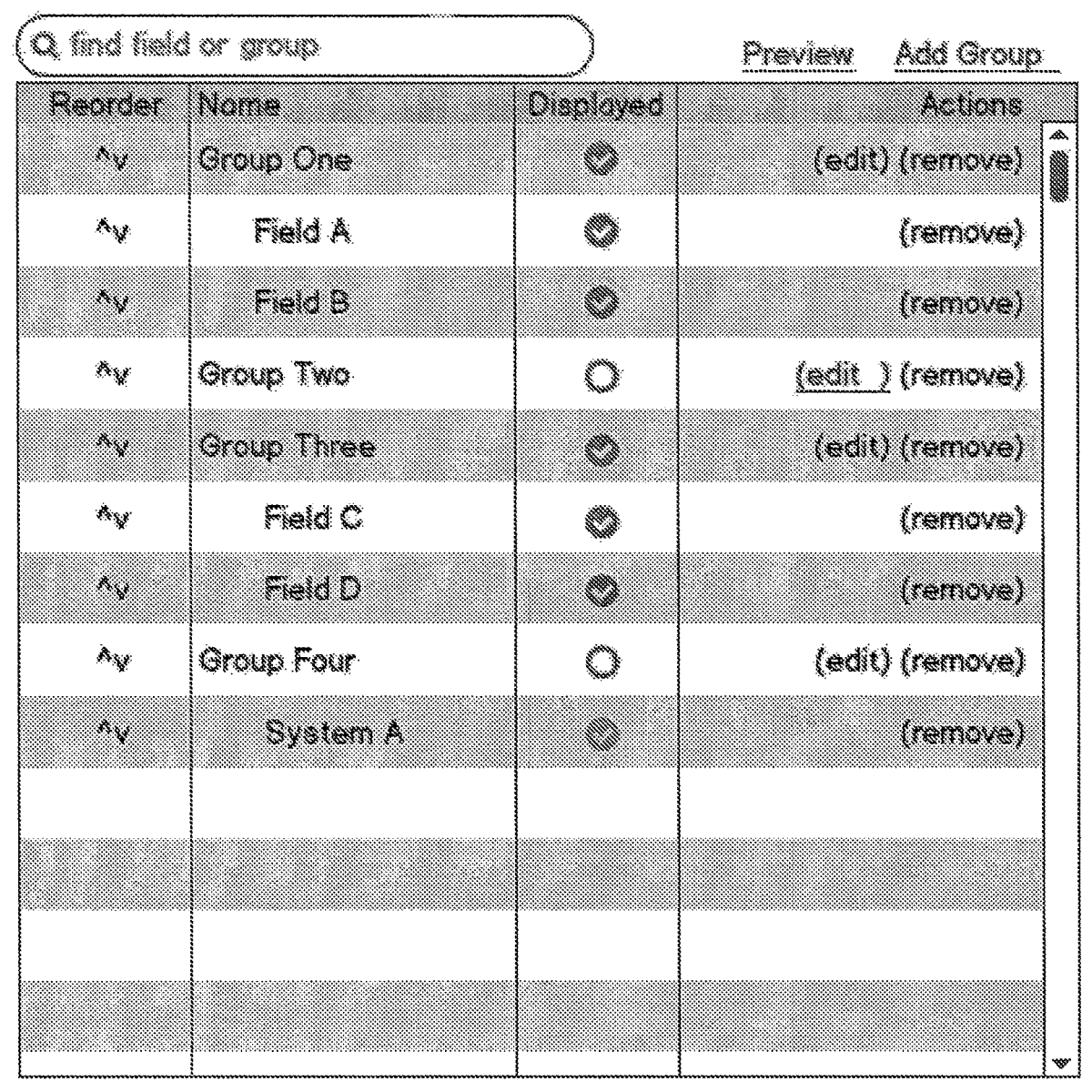

FIG. 13 illustrates an example UI of a smart filter. From this page, a user can access other display configurations for the automated system 102 without having to return to the central landing page. It provides the user access to a preview of the configuration so they can verify any changes without having to leave the current page. Further, as the list of components in the panel can get quite long, a search box is provided for quickly filtering to a particular component.

From the smart filter, a user can add/edit groups as well. The user can select from fields that are not already in other groups when adding fields to a new Smart Filter group. In a preexisting group, the previously selected fields appear in a pick list and are preselected.

FIG. 14 depicts an exemplary listing of fields in a project. All fields in the project are listed, along with basic information about how that field is used. Selecting a field name takes the user to an edit interface for a field. Selecting a field row loads the field's information in a separate panel (depicted to the side in exemplary FIG. 14). The side panel 1404 displays Extraction Rule information for field 1402.

The side panel 1404 highlights tagging success and publication status of a field selected in the grid. If there is no field selected, then the panel displays the same information but at the project level.

Selecting a field allows a user to view and edit information about the field, such as where it is displayed, smart filters, groups, and tagging panel properties. Further, a user can view and edit field values and taggers as well.

FIG. 15 displays an exemplary user interface for further information regarding changes to Field C from FIG. 14. In box 1502, the percentage of substitutions, deletions, and insertions are depicted for the focus documents, as well as for all documents. In box 1504, the various taggers that apply to Field C are listed, along with additional information for each. As would be understood by persons of ordinary skill in the art, fewer or additional components may be present in box 1502 and/or box 1504. Further, a document viewer pane may also be present on the same UI such that a user can view specific documents to see where the substitutions, deletions, and/or insertions have occurred in certain documents.

FIG. 16A depicts an exemplary partial user interface for editing a specific tagger, such as Tagger A of Field C from FIG. 15. Within a tagger list, the edit-tagger form is displayed. When editing a tagger, the Field selection is fixed to the current field and tagger. Further, when editing a tagger, the "stats" controls may be disabled. The value found by the currently edited tagger is updated.

When editing a tagger, a user can test changes for the current document that would impact a value displayed in the value section and would affect particular documents that may be simultaneously displayed in a document view (not depicted). If the user is satisfied with the changes, they can apply the changes and recalculate values for the entire set of documents. If the user is not satisfied, they can cancel and all changes to the tagger are discarded. In selecting a particular value, the user can either select a slot outcome (as depicted in the figure), or select a fixed value (field value dependent).

Figure 16B:
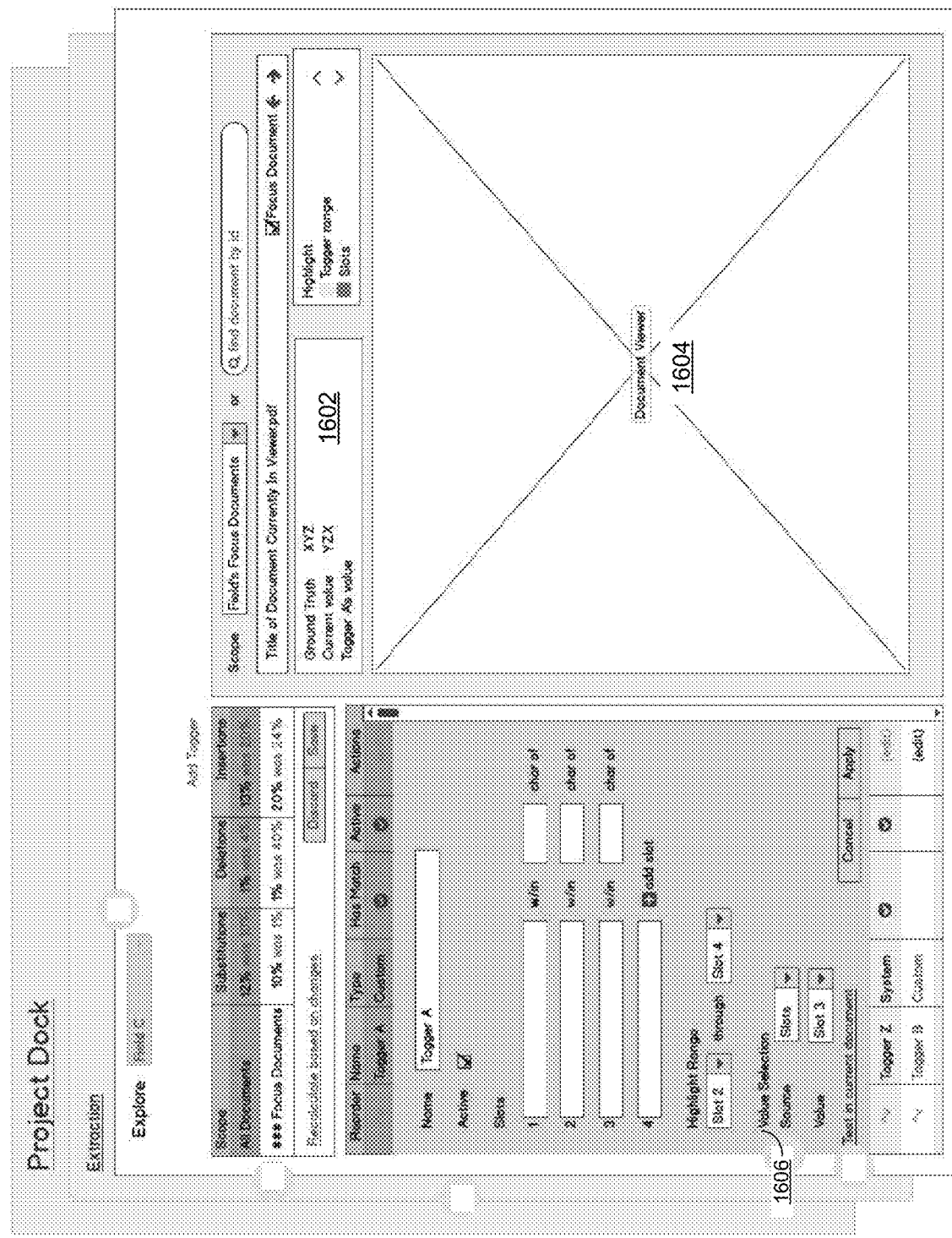
FIG. 16B illustrates an example graphical user interface presented to a user for editing a specific tagger.

FIG. 16B depicts an exemplary user interface for editing a specific tagger, such as Tagger A of Field C from FIG. 15 and FIG. 16A. When editing a tagger, the field selection is fixed to the current field and tagger, "Field C" in this exemplary embodiment. The "stats" controls may be disabled, where the percentages of S/D/I are shown on the user interface. Further, the "values" section 1602 is updated to show the value found by the currently edited tagger. Within the tagger list, the edit tagger form is displayed.

When editing a tagger, the user can test changes for the current document, which would impact the value displayed in the value section 1602 and would affect what is highlighted in the document viewer 1604. If the user is satisfied, they can apply the changes to the taggers and recalculate the entire set. If the user is not satisfied, they can cancel and all changes to that tagger are discarded. In various embodiments, the value selection 1606 has two options: (1) select a slot outcome, as depicted in the figure, or (2) select a fixed value, which is field type dependent. As would be understood by persons of ordinary skill in the art, other options for value selection may also be present than depicted here.

FIG. 17 illustrates an exemplary use case of an extractor tagger that is modified. Box 1702 shows that the field for extraction is a Team name. Text 1704 is exemplary text from a document. Extractor tagger 1706 is a first tagger for evaluating text 1704 for a Team name field. Extractor tagger 1706 shows that from the beginning of text to 30 characters, the next 20 characters are to be copied. Box 1708 shows the results of that tagger applied to text 1704. As shown, the team name of "Alpha Beta team" is not fully shown in the text. The user may then choose to modify the extractor tagger into 1' as depicted in tagger 1710. With this modified tagger, box 1710 shows that "Alpha Beta team" is then copied from text 1704. When the automated extraction is operated by the system on text 1712, the team name will be extracted and captured. In this way, by modifying tagger 1706 into tagger 1708, the automated extraction of text 1704 is improved.

Figure 18:
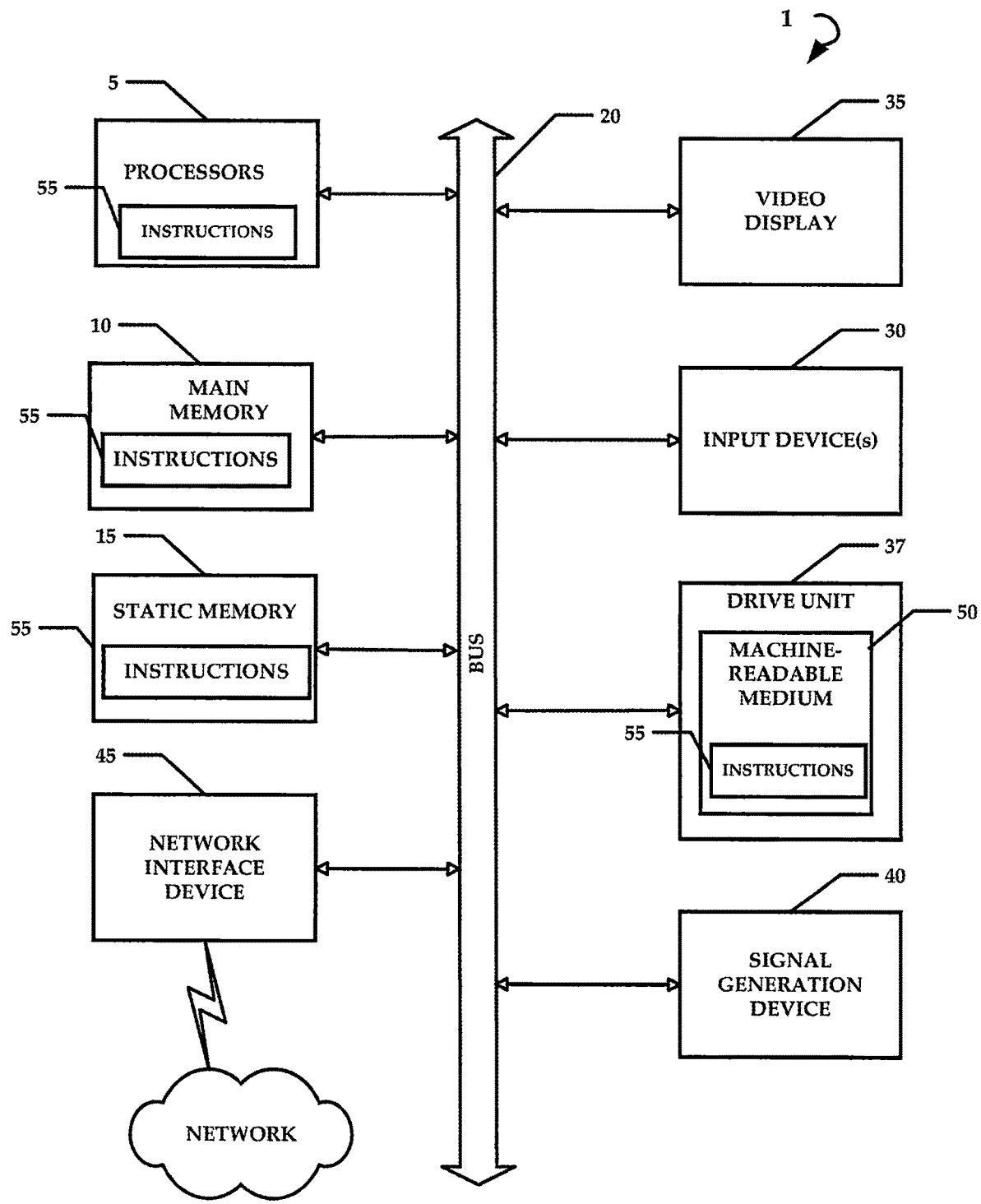
FIG. 18 is a schematic diagram of an example computer device that can be utilized to implement aspects of the present technology.

FIG. 18 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be, for example, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within static memory 15 and/or within the processors 5 during execution thereof by the computer system 1. The main memory 10, static memory 15, and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

User input devices can provide a portion of a user interface. User input devices may include one or more microphones, an alphanumeric keypad, such as a keyboard, for inputting alphanumeric and other information, or a pointing device, such as a mouse, a trackball, stylus, or cursor direction keys. User input devices can also include a touchscreen. Additionally, the computer system 1 as shown in FIG. 18 may include output devices. Suitable output devices include speakers, printers, network interfaces, and monitors.

A graphics display system may further include a liquid crystal display (LCD) or other suitable display device. Graphics display system is configurable to receive textual and graphical information and processes the information for output to the display device.

Additionally, peripheral devices may include any type of computer support device to add additional functionality to the computer system.

The components provided in the computer system 1 of FIG. 18 are those typically found in computer systems that may be suitable for use with embodiments of the present disclosure and are intended to represent a broad category of such computer components that are well known in the art. Thus, the computer system 1 of FIG. 18 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In some embodiments, the computing system 1 may be implemented as a cloud-based computing environment, such as a virtual machine operating within a computing cloud. In other embodiments, the computing system 1 may itself include a cloud-based computing environment, where the functionalities of the computing system 1 are executed in a distributed fashion. Thus, the computing system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing device of computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its nonitalicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/ or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A computer-implemented method for optimizing automated document feature extraction, the method comprising:
   providing a user with a graphical user interface to edit at least one field within a set of focus documents and simultaneously view at least one document from the set of focus documents;
   receiving an edit from the user, via the graphical user interface, to one or more extractor taggers applicable to the at least one field within the set of focus documents;
   updating a staging environment for an automated document feature extraction system;
   performing automated document feature extraction in the staging environment on the set of focus documents;
   verifying that the automated document feature extraction utilizing the edited one or more extractor taggers passes a quality check on the set of focus documents; and
   updating the automated document feature extraction system with the edited one or more extractor taggers to enhance automated document feature extraction within the set of focus documents and a second set of additional documents.

2. The method of claim 1, further comprising:
   verifying that the automated document feature extraction utilizing the edited one or more extractor taggers passes a quality check on a ground truth set of documents.

3. The method of claim 1, wherein the received edit from the user to the one or more extractor taggers is a creation of a new extractor tagger applicable to the at least one field within the set of focus documents.

4. The method of claim 1, wherein the received edit from the user to the one or more extractor taggers is a modification of an extractor tagger applicable to the at least one field within the set of focus documents.

5. The method of claim 1, wherein the received edit from the user to the one or more extractor taggers is a deletion of an extractor tagger applicable to the at least one field within the set of focus documents.

6. The method of claim 1, wherein the received edit from the user to the one or more extractor taggers is a reordering of at least two extractor taggers applicable to the at least one field within the set of focus documents.

7. A computer-implemented method for optimizing automated document feature extraction, the method comprising:
   providing a user with a graphical user interface to edit at least one field within a set of focus documents and simultaneously view at least one document from the set of focus documents;
   receiving an edit from the user, via the graphical user interface, to one or more extractor taggers applicable to the at least one field within the set of focus documents;
   updating a staging environment for an automated document feature extraction system;
   performing automated document feature extraction in the staging environment on the set of focus documents;
   verifying whether the automated document feature extraction utilizing the edited one or more extractor taggers passes a quality check on the set of focus documents; and updating at least one data model within the automated document feature extraction system with the edited one or more extractor taggers to enhance automated document feature extraction within the set of focus documents and a second set of additional documents.

8. The method of claim 7, further comprising:
verifying that the automated document feature extraction utilizing the edited one or more extractor taggers passes a quality check on a ground truth set of documents.

9. The method of claim 7, wherein the received edit from the user to the one or more extractor taggers is a reordering of at least two extractor taggers.

10. The method of claim 7, wherein the received edit from the user to the one or more extractor taggers is a creation of a new extractor tagger.

11. The method of claim 7, wherein the received edit from the user to the one or more extractor taggers is a modification or deletion of one or more existing extractor taggers.

12. The method of claim 7, further comprising:
displaying to the user, via the graphical user interface, an amount of substitutions, deletions, and insertions made by the automated document feature extraction system as a result of the at least one updated data model.

13. A system, comprising:
a processor; and
a memory for storing executable instructions, the processor executing the instructions to:
provide a user with a graphical user interface to edit at least one field within a set of focus documents and simultaneously view at least one document from the set of focus documents;
receive an edit from the user, via the graphical user interface, to one or more extractor taggers applicable to the at least one field within the set of focus documents;
update a staging environment for an automated document feature extraction system;
perform automated document feature extraction in the staging environment on the set of focus documents;
verify that the automated document feature extraction utilizing the edited one or more extractor taggers passes a quality check on the set of focus documents; and
publish the edited one or more extractor taggers in an updated data model within the automated document feature extraction system to enhance automated document feature extraction within the set of focus documents and a second set of additional documents.

14. The system of claim 13, wherein the processor further executes the instructions to:
verify that the automated document feature extraction utilizing the edited one or more extractor taggers passes a quality check on a ground truth set of documents.

15. The system of claim 13, wherein the received edit from the user to the one or more extractor taggers is a creation of a new extractor tagger applicable to the at least one field within the set of focus documents.

16. The system of claim 13, wherein the received edit from the user to the one or more extractor taggers is a modification of an extractor tagger applicable to the at least one field within the set of focus documents.

17. The system of claim 13, wherein the received edit from the user to the one or more extractor taggers is a deletion of an extractor tagger applicable to the at least one field within the set of focus documents.

18. The system of claim 13, wherein the received edit from the user to the one or more extractor taggers is a reordering of at least two extractor taggers applicable to the at least one field within the set of focus documents.

19. The system of claim 13, wherein the processor further executes the instructions to:
display to the user, via the graphical user interface, an amount of substitutions, deletions, and insertions made by the automated document feature extraction system as a result of the updated data model.

20. The system of claim 13, wherein the processor further executes the instructions to:
export a report from the automated document feature extraction system to a second user, the report comprising information regarding specified fields within the updated data model.

* * * * *